United States Patent
Seol et al.

(10) Patent No.: US 12,526,474 B2
(45) Date of Patent: Jan. 13, 2026

(54) DISPLAY DEVICE

(71) Applicant: LG ELECTRONICS INC., Seoul (KR)

(72) Inventors: Seongwoon Seol, Seoul (KR); Obong An, Seoul (KR); Eunyoung Cho, Seoul (KR); Miyeon Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 18/273,734

(22) PCT Filed: Feb. 26, 2021

(86) PCT No.: PCT/KR2021/002514
§ 371 (c)(1),
(2) Date: Jul. 21, 2023

(87) PCT Pub. No.: WO2022/181862
PCT Pub. Date: Sep. 1, 2022

(65) Prior Publication Data
US 2024/0107109 A1 Mar. 28, 2024

(51) Int. Cl.
*H04N 21/436* (2011.01)
*H04N 21/41* (2011.01)
(Continued)

(52) U.S. Cl.
CPC ....... *H04N 21/436* (2013.01); *H04N 21/4104* (2013.01); *H04N 21/43615* (2013.01); *H04N 21/4383* (2013.01); *H04N 21/4823* (2013.01)

(58) Field of Classification Search
CPC ............ H04N 21/436; H04N 21/4408; H04N 21/4823; H04N 21/4383; H04N 21/4104; H04N 21/43615
See application file for complete search history.

(56) References Cited

U.S. PATENT DOCUMENTS 11,012,739 B2 * 5/2021 Chang ................ H04N 21/4316
11,164,571 B2 * 11/2021 Luan .................... H04N 21/233
(Continued)

FOREIGN PATENT DOCUMENTS

KR 10-2010-0072411 7/2010
KR 10-2011-0126845 11/2011
(Continued)

OTHER PUBLICATIONS

PCT International Application No. PCT/KR2021/002514, International Search Report dated Nov. 11, 2021, 6 page.

*Primary Examiner* — Pinkal R Chokshi
(74) *Attorney, Agent, or Firm* — LEE, HONG, DEGERMAN, KANG & WAIMEY

(57) ABSTRACT

The present disclosure provides a display device comprising: a display unit for displaying a content; and a processor, wherein the processor is configured to: broadcast first channel information providing the content to at least one other display device if a mirroring operation of displaying the content on an external device is being performed; obtain hash data and a content ID associated with the content from the at least one other device; transmit the content ID and the hash data to a scene recognition information server; and obtain scene recognition information corresponding to the content via the scene recognition information server.

15 Claims, 9 Drawing Sheets

(51) Int. Cl.
*H04N 21/438* (2011.01)
*H04N 21/482* (2011.01)

(56) References Cited

U.S. PATENT DOCUMENTS

| | | | |
|---|---|---|---|
| 11,533,531 B1* | 12/2022 | Link | H04N 21/4302 |
| 2012/0144416 A1* | 6/2012 | Wetzer | H04N 21/41265 |
| | | | 725/14 |
| 2013/0014146 A1* | 1/2013 | Bhatia | G06Q 30/0241 |
| | | | 725/14 |
| 2014/0036149 A1* | 2/2014 | Ogawa | H04N 21/43637 |
| | | | 348/468 |
| 2014/0351849 A1* | 11/2014 | Tsuji | H04N 21/4821 |
| | | | 725/32 |
| 2019/0325259 A1* | 10/2019 | Murphy | G06F 18/2148 |
| 2021/0152879 A1* | 5/2021 | Choi | H04N 21/41407 |
| 2021/0397401 A1 | 12/2021 | Kim et al. | |
| 2022/0053242 A1 | 2/2022 | Lee et al. | |
| 2022/0116676 A1* | 4/2022 | Wang | H04N 21/47815 |

FOREIGN PATENT DOCUMENTS

| | | | |
|---|---|---|---|
| KR | 2011126845 A * | 11/2011 | |
| KR | 10-2014-0044663 | 4/2014 | |
| KR | 10-2019-0034856 | 4/2019 | |
| KR | 10-2021-0002797 | 1/2021 | |
| KR | 10-2021-0157743 | 12/2021 | |
| WO | 2021-010518 | 1/2021 | |

* cited by examiner

DISPLAY DEVICE

CROSS-REFERENCE TO RELATED APPLICATION(S)

This application is the National Stage filing under 35 U.S.C. 371 of International Application No. PCT/KR2021/002514, filed on Feb. 26, 2021, the contents of which is hereby incorporated by reference herein in its entirety.

TECHNICAL FIELD

The present disclosure relates to a display device, and more particularly, to a display device that recognizes reproduced content.

BACKGROUND ART

Recently, digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users can actively select the types of watching programs, the watching time, and the like. The IPTV and smart TV services can provide various additional services, such as Internet search, home shopping, and online games, based on such interactivity.

On the other hand, when watching content, a user may want to obtain additional information added to the content. For example, when watching content, a user may want to purchase a product appearing in the content. In this case, the user has to directly search for a product appearing in the content by using the Internet or the like, but it may be difficult to find a product that matches the product appearing in the content. Accordingly, it is possible to recognize the content that the user is currently watching and provide shopping information matching the current scene as additional information.

Therefore, in order to improve user convenience, the importance of technology for allowing a display device to smoothly recognize content and provide information related to the content to a user is emerging.

DISCLOSURE OF INVENTION

Technical Problem

An object of the present disclosure is to provide a display device capable of recognizing content being reproduced in conjunction with other display devices and providing scene recognition information related to the content while a capture resource is being used by performing mirroring from a display device to an external device.

In addition, an object of the present disclosure is to provide a display device capable of recognizing content being reproduced in conjunction with other display devices and providing scene recognition information even when information about the content being reproduced cannot be obtained.

Technical Solution

A display device according to an embodiment of the present disclosure includes: a display configured to display content; and a processor configured to: broadcast first channel information providing the content to at least one other display device when a mirroring operation of displaying the content on an external device is being performed; obtain hash data and a content ID associated with the content from the at least one other device; transmit the content ID and the hash data to a scene recognition information server; and obtain scene recognition information corresponding to the content via the scene recognition information server.

The display device according to an embodiment of the present disclosure includes the processor configured to display the scene recognition information on the display.

The display device according to an embodiment of the present disclosure includes the processor configured to perform an operation of mirroring, to the external device, a captured image obtained by capturing the content displayed on the display and the scene recognition information together.

The display device according to an embodiment of the present disclosure includes the processor configured to: obtain second channel information broadcast from the at least one other display device; when a content recognition function is operable, determine whether the content displayed on the at least one other display device is the same content as the content displayed on the display device, based on the second channel information; and when the same content is being displayed, broadcast a content ID and hash data for the same content.

The display device according to an embodiment of the present disclosure includes the processor configured to: generate a captured image by capturing at least one scene of the same content; generate a capture hash for the captured image; transmit the capture hash to a content information server; obtain a content ID corresponding to the capture hash from the content information server; and broadcast the content ID and hash data for the captured image.

The display device according to an embodiment of the present disclosure includes the processor configured to, when the same content is not being displayed, display the same content on the display for a predetermined time, based on the second channel information.

The display device according to an embodiment of the present disclosure includes the processor configured to: receive a request for continuous viewing from the at least one other display device; receive channel information, a content ID, and hash data associated with content displayed on the at least one other display device; and perform scene recognition based on the channel information, the content ID, and the hash data.

The display device according to an embodiment of the present disclosure includes the processor configured to, when the power of the display device is turned on, initialize a program associated with content recognition and establish a connection with a content information server.

A scene recognition method according to an embodiment of the present disclosure includes: displaying content; performing a mirroring operation of displaying the content on an external device; broadcasting first channel information providing the content to at least one other display device; obtaining hash data and a content ID associated with the content from the at least one other device; transmitting the content ID and the hash data to a scene recognition information server; and obtaining scene recognition information corresponding to the content via the scene recognition information server.

The scene recognition method according to an embodiment of the present disclosure further includes displaying the scene recognition information.

The scene recognition method according to an embodiment of the present disclosure further includes: capturing the displayed content and the displayed scene recognition information together; and performing an operation of mirroring the captured image to the external device.

A scene recognition method according to an embodiment of the present disclosure includes: obtaining channel information broadcast from at least one other display device; determining whether a content recognition function is operable; when the content recognition function is operable, determining whether the content displayed on the at least one other display device is the same content as the content displayed on the display device, based on the channel information; and when the same content is being displayed, broadcasting a content ID and hash data for the same content.

The scene recognition method according to an embodiment of the present disclosure includes: generating a captured image obtained by capturing at least one scene of the same content; generating a capture hash for the captured image; transmitting the capture hash to a content information server; and obtaining a content ID corresponding to the capture hash from the content information server.

The scene recognition method according to an embodiment of the present disclosure further includes, when the same content is not being displayed, displaying the same content for a predetermined time based on the channel information.

Advantageous Effects

According to an embodiment of the present disclosure, it is possible to recognize content being reproduced in conjunction with another display device and provide scene recognition information related to the content while a capture resource is being used by performing mirroring from a display device to an external device.

According to an embodiment of the present disclosure, it is possible to recognize content being reproduced in conjunction with an other display device and provide scene recognition information even when information about the content being reproduced cannot be obtained.

According to an embodiment of the present disclosure, even in situations where it is impossible to obtain information about the content being reproduced, such as initialization of programs related to content recognition and delayed connection to a server, scene recognition information may be provided by recognizing content being reproduced in conjunction with other display devices.

BEST MODE FOR CARRYING OUT THE INVENTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
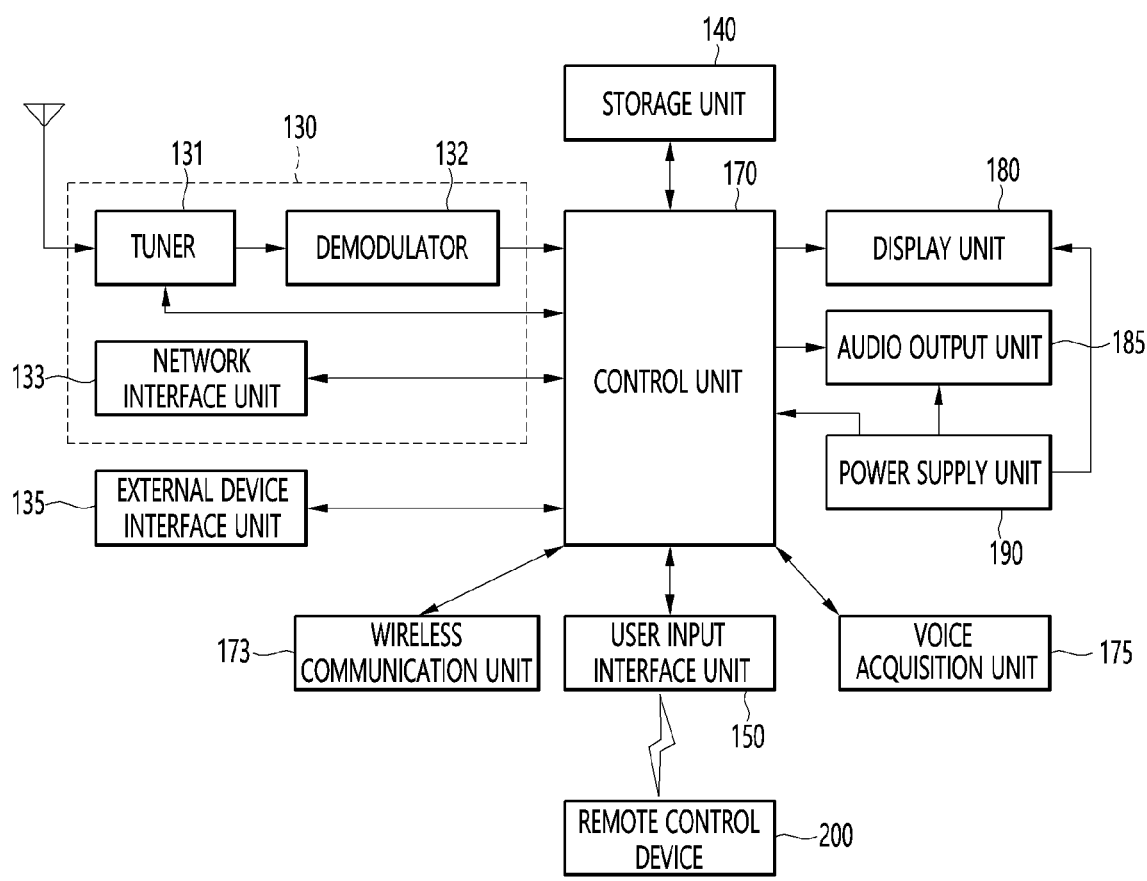
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a control unit 170, a wireless communication interface unit 173, a display unit 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator.

That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not shown) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™ Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not shown) and may acquire audio around the display device 100 through the microphone (not shown).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

A remote control device according to an embodiment of the present disclosure will be described with reference to FIGS. 2 and 3.

Figure 2:
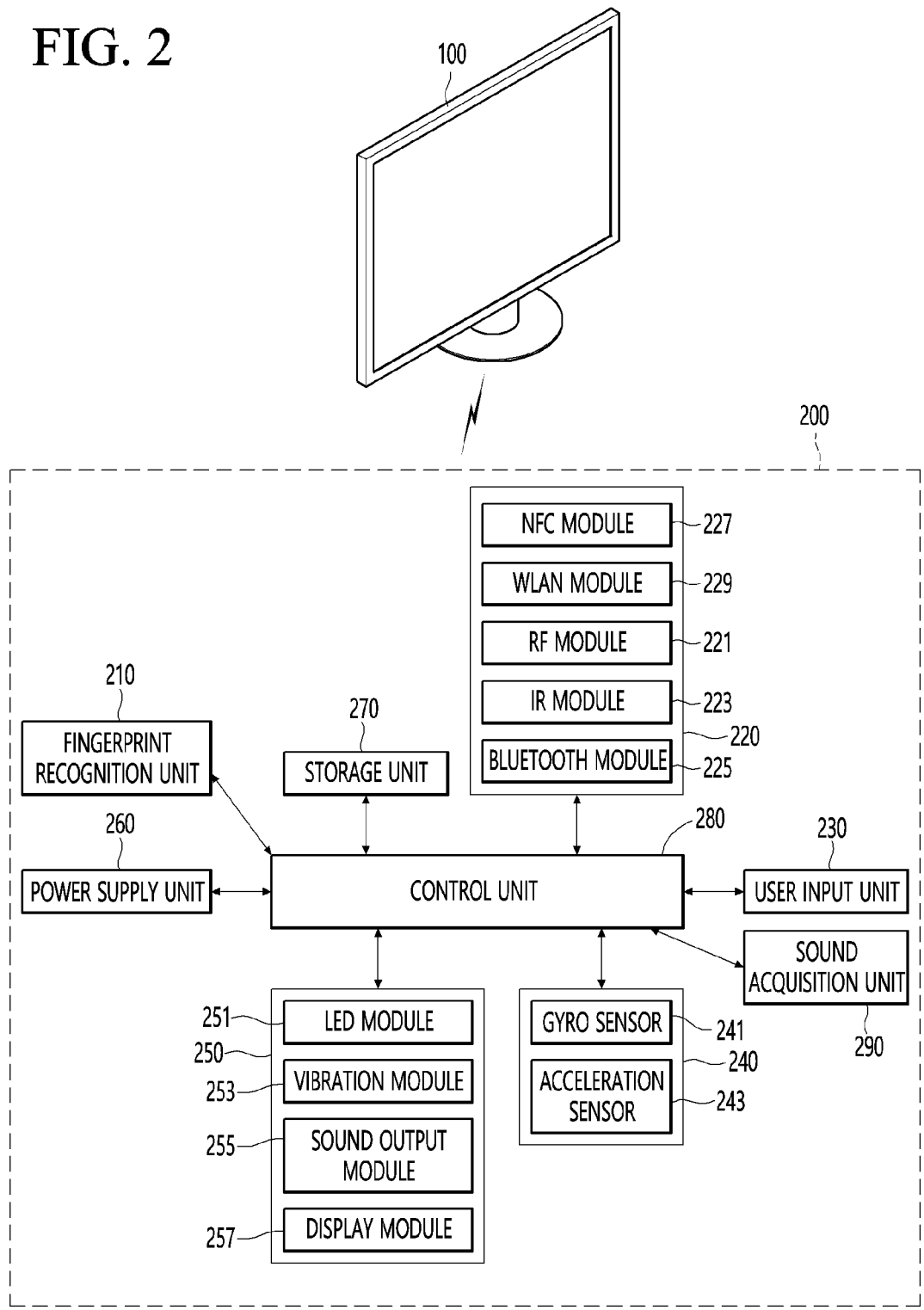
FIG. 2 is a block diagram illustrating a remote control device according to an embodiment of the present disclosure
Figure 3:
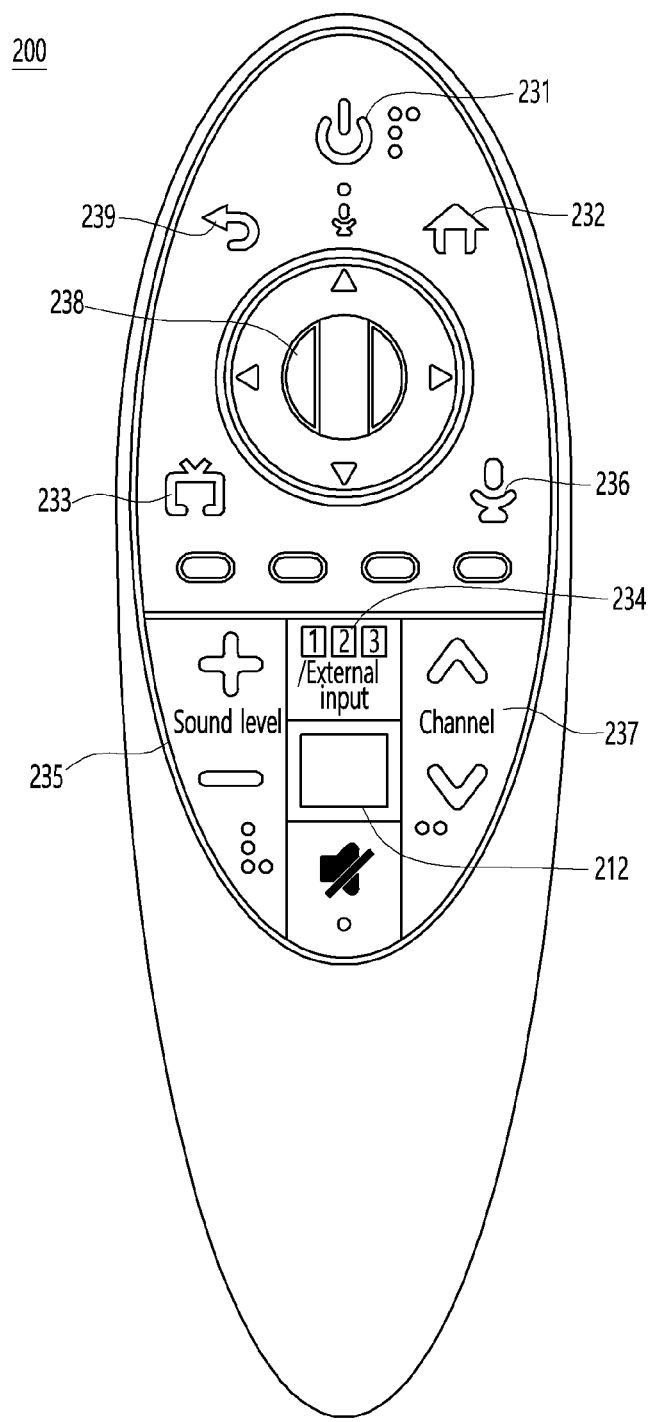
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication unit 220.

Moreover, the remote control device 200 may receive signals transmitted from the display device 100 through the RF module 221 and if necessary, may transmit a command for power on/off, channel change, and volume change to the display device 100 through the IR module 223.

The user input unit 230 may be configured with a keypad, a button, a touch pad, or a touch screen. A user may operate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input unit 230 includes a touch screen, a user may touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display unit 180 of the display device 100.

The output unit 250 may output image or voice signals in response to the operation of the user input unit 230, or may output image or voice signals corresponding to signals transmitted from the display device 100. A user may recognize whether the user input unit 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the supply of power if a predetermined key provided at the remote control device 200 is operated.

The storage unit 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to the control of the remote control device 200. The control unit 280 may transmit a signal corresponding to a predetermined key operation of the user input unit 230 or a signal corresponding to the movement of the remote control device 200 sensed by the sensor unit 240 to the display device 100 through the wireless communication unit 220.

In addition, the sound acquisition unit 290 of the remote control device 200 may acquire voice.

The sound acquisition unit 290 may include at least one microphone and acquire voice through the microphone.

Figure 4:
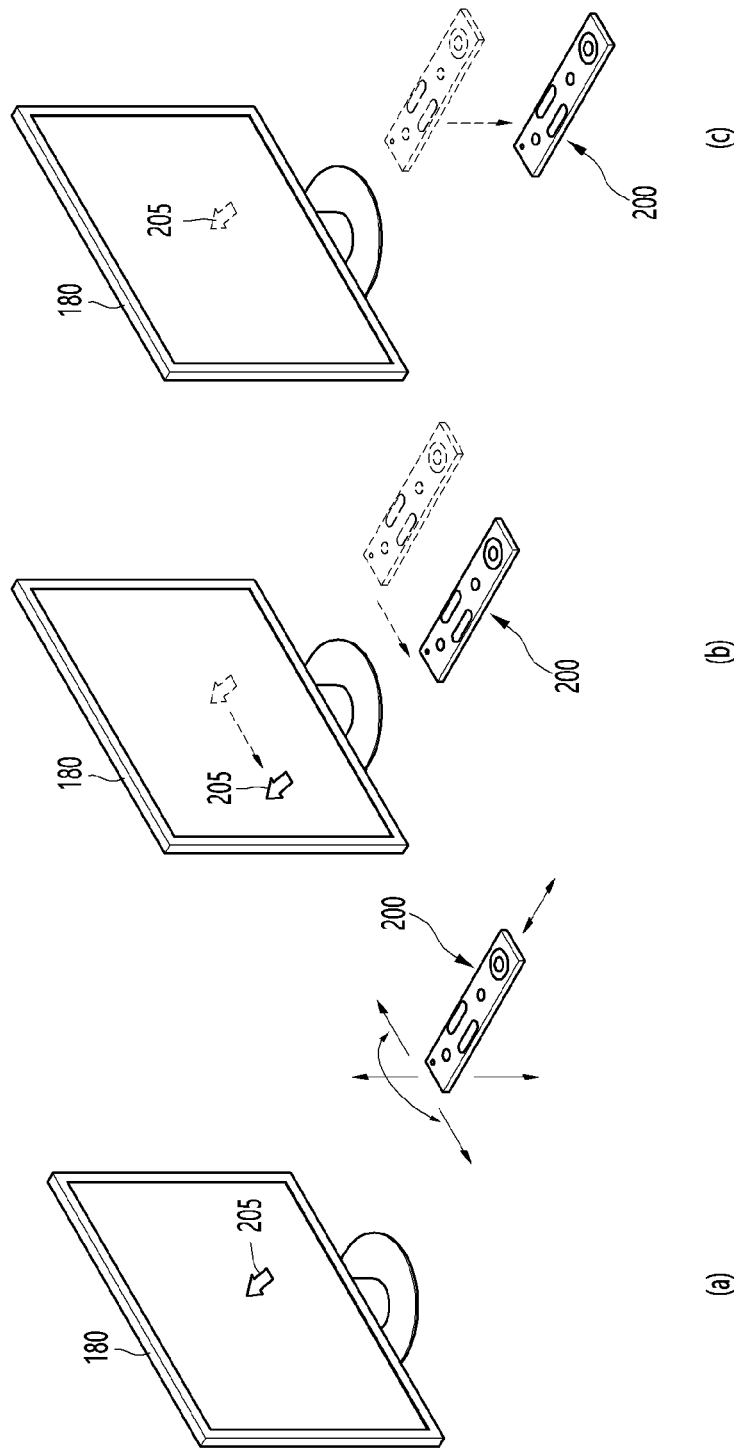
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(a) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(c) illustrates that while a specific button in the remote control device 200 is pressed, a user moves the remote control device 200 away from the display unit 180. Thus, a selected region in the display unit 180 corresponding to the pointer 205 may be zoomed in and displayed in an enlarged size.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Meanwhile, the control unit 170 may be referred to as a processor 170. The wireless communication unit 173 may be referred to as a communication interface 173. ALSO, the storage unit 140 may be referred to as a memory 140.

Figure 5:
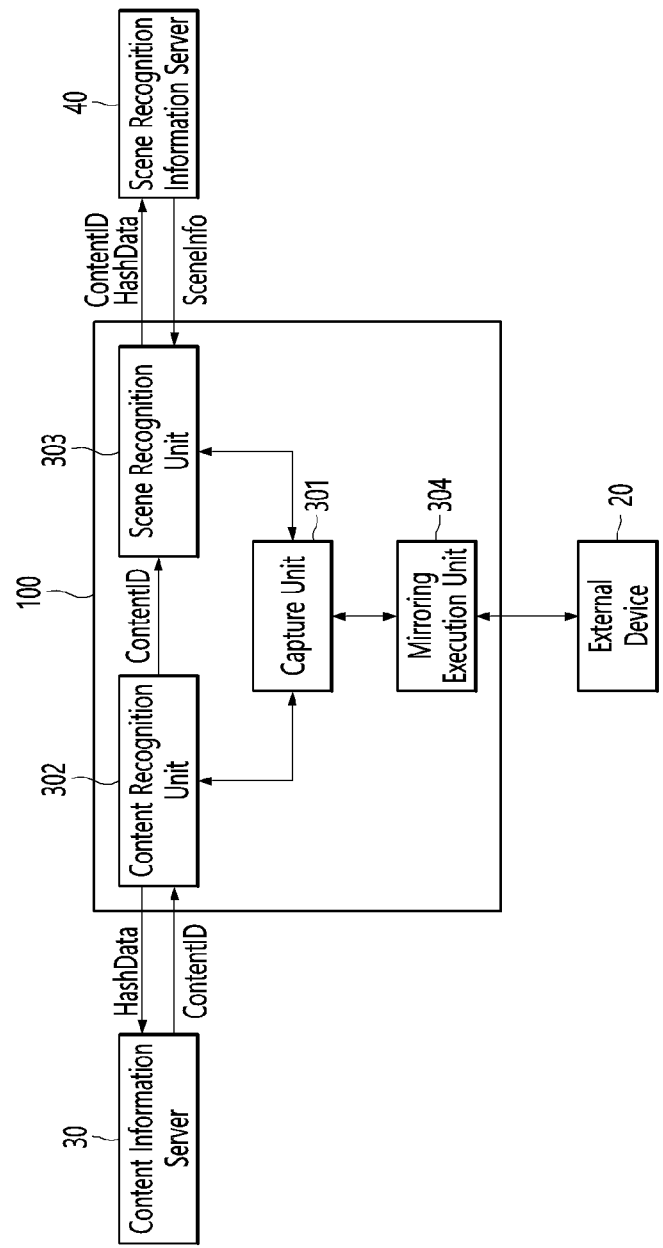
FIG. 5 is a block diagram for describing a method, performed by a display device, for obtaining scene recognition information by recognizing content being displayed, according to an embodiment of the present disclosure.

FIG. 5 is a block diagram for describing a method, performed by a display device, for obtaining scene recognition information by recognizing content being reproduced, according to an embodiment of the present disclosure.

The display device 100 may obtain scene recognition information about content being displayed on the display 180 through external servers 30 and 40. Specifically, the display device 100 may obtain the scene recognition information about the content by transmitting data regarding the captured image of the content to the external servers 30 and 40 and receiving response data for the data regarding the captured image from the external server 30 and 40.

In this case, the external servers 30 and 40 may include at least one of a content information server 30 and a scene recognition information server 40. The data regarding the captured image may include a capture hash (CaptureHash), hash data (HashData), a content ID (ContentID), and the like.

The display device 100 may include a capture unit 301, a content recognition unit 302, a scene recognition unit 303, and a mirroring execution unit 304. The capture unit 301, the content recognition unit 302, the scene recognition unit 303, and the mirroring execution unit 304 may be one component of the processor 170.

The capture unit 301 may capture a scene of content currently being displayed on the display 180. The capture unit 301 may obtain a captured image of content.

The capture unit 301 may transmit the captured image to the content recognition unit 302 and the scene recognition unit 303.

The content recognition unit 302 may recognize the content being displayed on the display 180 through the captured image. That is, the content recognition unit 302 may obtain information related to the content displayed on the display 180. The content recognition unit 302 may extract a capture hash of the captured image and recognize content information in a screen currently watched by the user in real time based on the capture hash. The content recognition unit 302 may obtain a content ID (ContentID) that is identification information of the content. The content ID may include information about the title of the content. The capture hash may be data obtained by extracting features of a specific scene from a digital image being displayed on the display 180 through a predetermined algorithm and converting the extracted features into a character string.

The content recognition unit 302 may receive the captured image from the capture unit 310 and obtain the capture hash from the input captured image. The content recognition unit 302 may transmit the capture hash to the content information server 30 and obtain a content ID corresponding to the capture hash from the content information server 30. Accordingly, the content recognition unit 302 may obtain the title or name of the content from the content ID.

On the other hand, when the display device 100 is turned on to operate, a predetermined time (for example, several seconds to several minutes) may be required when the content recognition unit 302 initializes various programs (for example, Automatic Content Recognition (ACR) SDK) required for content recognition or sets connection with the content information server 30 at the beginning of the operation. In this case, a content recognition operation may be delayed for the predetermined time.

On the other hand, the content recognition unit 302 may transmit the obtained content ID to the scene recognition unit 303.

The scene recognition unit 303 may obtain scene recognition information associated with a scene in a predetermined scene of the content. The scene recognition unit 303 may obtain scene recognition information (SceneInfo), which is information related to the content, at a predetermined content reproduction time. For example, the scene recognition unit 303 may obtain shopping information associated with a necklace worn by a character appearing at a predetermined content reproduction time.

The scene recognition unit 303 may transmit the content ID received from the content recognition unit 302 and the hash data for the captured image obtained from the capture unit 301 to the scene recognition information server 40. Here, the hash data may be a hash value for the captured image captured by the capture unit 301.

The scene recognition information server 40 may obtain scene recognition information associated with a predetermined scene of the content based on the content reproduction time or the content ID received from the scene recognition unit 303. In addition, the scene recognition information server 40 may transmit the obtained scene recognition information to the display device 100. Accordingly, the scene recognition unit 303 may receive the scene recognition information from the scene recognition information server 40.

On the other hand, the mirroring execution unit 304 may obtain an image obtained by capturing a scene of the content currently being displayed on the display 180 through the capture unit 301, and may perform a mirroring operation by transmitting the obtained captured image to the external device 20.

The capture unit 301 may capture a scene of the content currently being displayed on the display 180 at a predetermined cycle, and the mirroring execution unit 304 may transmit the captured image captured at the predetermined cycle to the external device 20.

The external device 20 may display the received captured image so that the content displayed on the display device 100 is also displayed on the external device 20.

On the other hand, when the mirroring execution unit 304 performs the mirroring operation, the capture unit 301 may be operated by the mirroring execution unit 304 and capture resources may be occupied by the mirroring execution unit 304. In this case, there may occur a problem in that the content recognition unit 302 and the scene recognition unit 303 cannot obtain the captured image through the capture unit 301.

Figure 6:
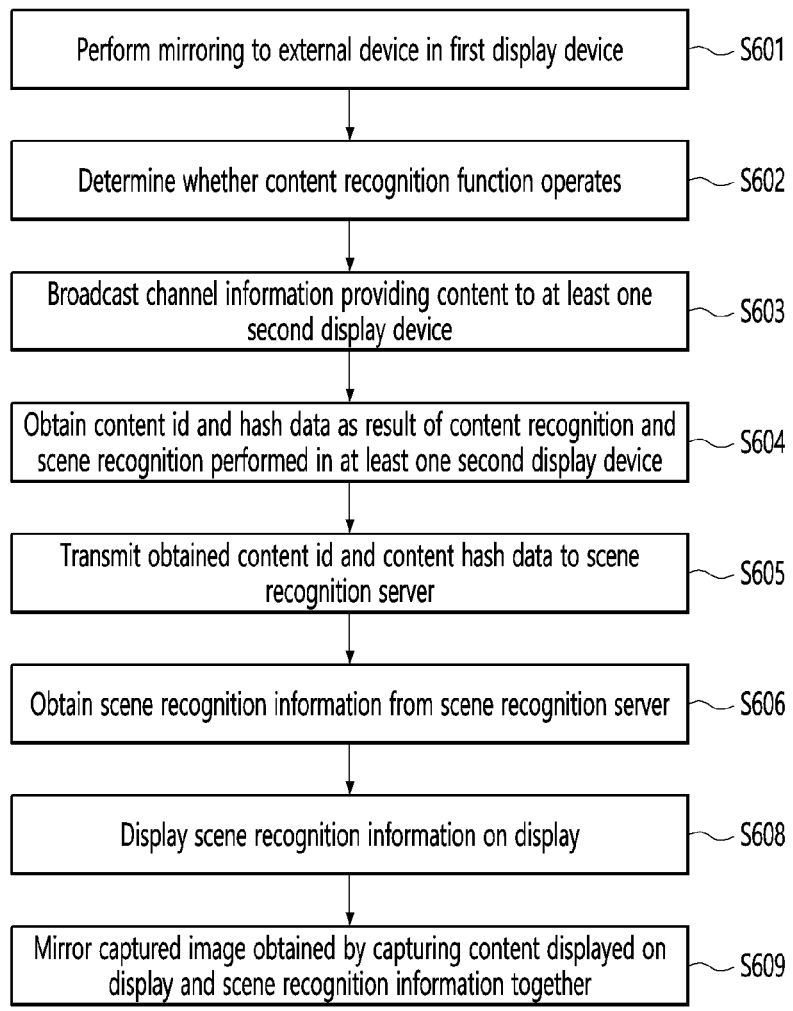
FIG. 6 is a flowchart for describing a method, performed by a display device, for obtaining scene recognition information of content being displayed, according to an embodiment of the present disclosure.
Figure 7:
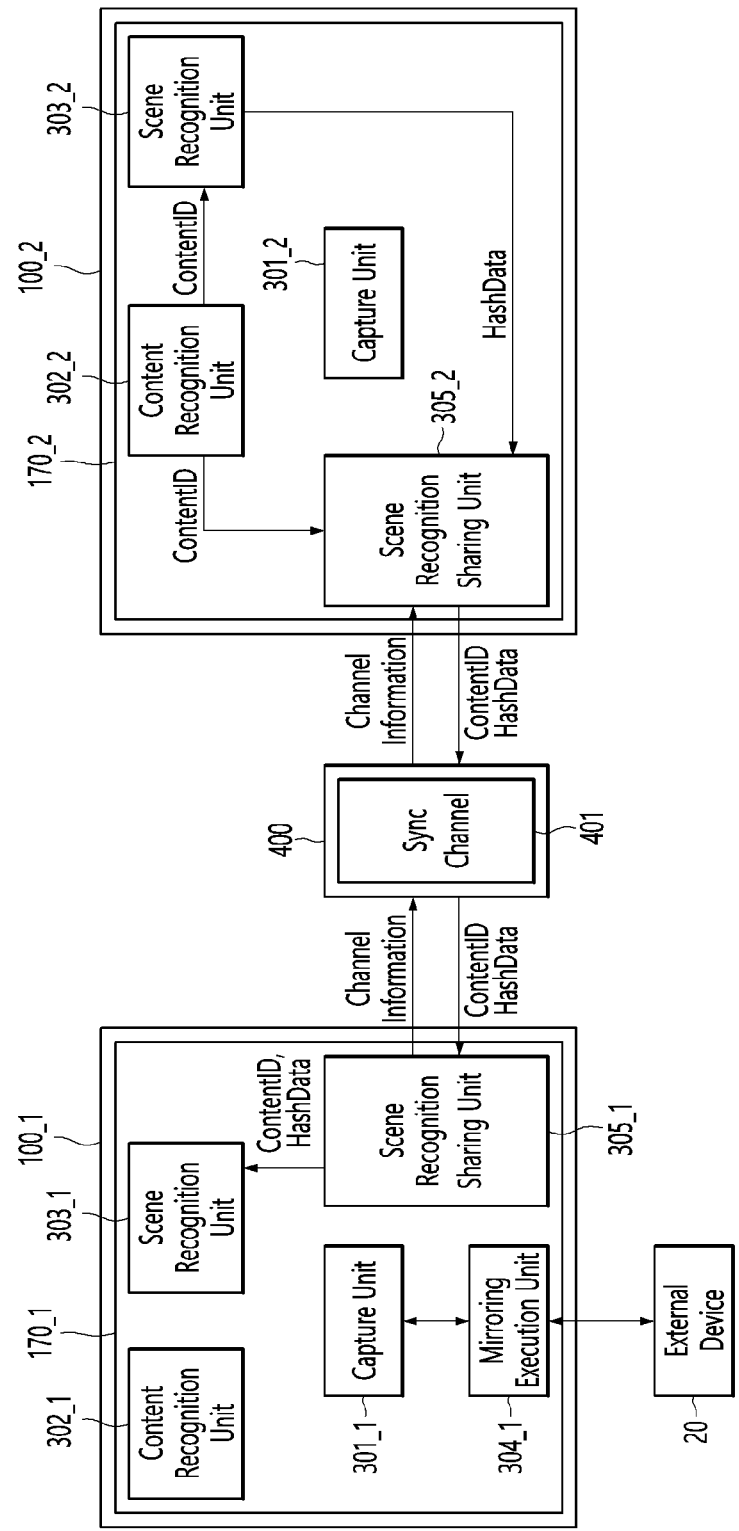
FIG. 7 is a block diagram for describing a method, performed by a display device, for obtaining scene recognition information of content being displayed, according to an embodiment of to the present disclosure.

FIG. 6 is a flowchart for describing a method, performed by a display device, for obtaining scene recognition information of content being displayed, according to an embodiment of the present disclosure. FIG. 7 is a block diagram for describing a method, performed by a display device, for obtaining scene recognition information of content being displayed, according to an embodiment of to the present disclosure.

Referring to FIGS. 6 and 7, a first processor 170_1 may perform an operation of mirroring content displayed on the first display device 100_1 to an external device 20 (S601).

In this case, in the first display device 100_1, content currently displayed on the display 180 may be captured by a first capture unit 301_1, and images captured by the first capture unit 301_1 may be transmitted to the external device 20 and mirroring may be performed thereon.

A first processor 170_1 may determine whether a content recognition function operates (S602).

When the mirroring is performed, a capture resource of the first capture unit 301_1 may be occupied by a first mirroring execution unit 304_1, and a first content recognition unit 302_1 and a first scene recognition unit 303_1 may fail to recognize the content because the first content recognition unit 302_1 and the first scene recognition unit 303_1 cannot obtain a captured image of the content. In this case, the first processor 170_1 may determine that the content recognition function is not operable.

When the content recognition function is not operable in the first display device 100_1, a first scene recognition sharing unit 305_1 may obtain channel information about a channel through which the content currently displayed on the display 180 is provided. The channel information may include a name of a channel providing content displayed on the first display device 100_1, OTT information, set-top box information, and the like. The first scene recognition sharing unit 305_1 may be one component of the first processor 170_1.

The first scene recognition sharing unit 305_1 may enable the first display device 100_1 to perform scene recognition in association with at least one other second display device 100_2. The first scene recognition sharing unit 305_1 may transmit and receive various data related to scene recognition with the at least one other second display device 100_2.

The first display device 100_1 and the second display device 100_2 may transmit and receive data through a sync channel 401. The sync channel 401 may be established by a hub device 400 that manages communication channels of display devices. The hub device 400 may be a set-top box capable of providing content by connecting to display devices through wired/wireless communication.

The hub device 400 may broadcast channel information received from the first display device 100_1 to the at least one other second display device 100_2.

When there is no display device powered on among the at least one second display devices 100_2 connected through the sync channel 401 of the hub device 400, power of any second display device 100_2 may be turned on.

The first scene recognition sharing unit 305_1 may broadcast channel information providing currently displayed content to the at least one other second display device 100_2 (S603).

The second display device 100_2 may receive channel information broadcast from the first display device 100_1 through the sync channel 401 of the hub device 400.

In this case, a second processor 170_2 may determine whether a capture resource of a second capture unit 301_2 is usable for content recognition or scene recognition.

That is, the second processor 170_2 may perform an operation for scene recognition of the first display device 100_1 when the content recognition function is operable.

The second processor 170_2 may determine whether the content displayed on the second display device 100_2 is the same as the content displayed on the first display device 100_1, based on the received channel information.

When the second display device 100_2 displays the same content as the content displayed on the first display device 100_1, the second processor 170_2 may perform scene recognition without changing the displayed content.

On the other hand, when content that is not the same as the content displayed on the first display device 100_1 is being displayed, the second processor 170_2 may change the displayed content for a predetermined time so that the same content is displayed, based on the received channel information.

That is, when the capture resource of the second capture unit 301_2 is available and the same content as the content displayed on the first display device 100_1 is displayed, the second display device 100_2 may perform scene recognition on the corresponding content.

The second capture unit 301_2 may obtain a captured image by capturing a scene of the same content as that displayed on the first display device 100_1.

The second capture unit 301_2 may transmit the captured image to a second content recognition unit 302_2. The second content recognition unit 302_2 may transmit a capture hash of the input captured image to a content information server 30 and obtain a content ID corresponding to the capture hash from the content information server 30.

On the other hand, the second content recognition unit 302_2 may transmit the obtained content ID to the second scene recognition unit 303_2. In addition, the second content recognition unit 302_2 may transmit the obtained content ID to the second scene recognition sharing unit 305_2.

The second scene recognition unit 303_2 may transmit, to the second scene recognition sharing unit 305_2, the content ID received from the second content recognition unit 302_2 and hash data for the captured image obtained from the second capture unit 301_2.

The second scene recognition sharing unit 305_2 may broadcast the content ID and the hash data through the sync channel 401.

On the other hand, the first scene recognition sharing unit 305_1 of the first display device 100_1 may obtain the content ID and the hash data broadcast by the second scene recognition sharing unit 305_2 (S604). The first scene recognition sharing unit 305_1 may transmit the obtained content ID and hash data to the first scene recognition unit 303_1.

The first scene recognition unit 303_1 may transmit, to the scene recognition information server 40, the content ID and the hash data input from the first scene recognition sharing unit 305_1 (S605).

The first scene recognition unit 303_1 may obtain the scene recognition information from the scene recognition information server 40.

On the other hand, the first processor 170_1 may display the received scene recognition information on the display 180 (S608).

In this case, the first capture unit 301_1 may capture the content displayed on the display 180 and the scene recognition information associated with the content and may transmit the captured image to the mirroring execution unit 304_1 (S609).

The mirroring execution unit 304_1 may transmit, to the external device 20, an image obtained by capturing the content and the scene recognition information together, so that the external device 20 can display both the content and the scene recognition information.

Accordingly, the display device may obtain and display the scene recognition information even when mirroring is executed and capture resources are occupied.

Figure 8:
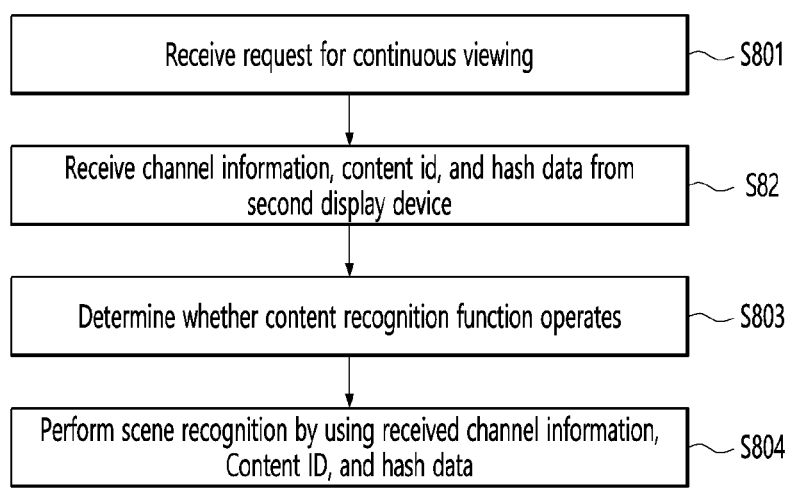
FIG. 8 is a flowchart for describing a method, performed by a display device, for obtaining scene recognition information of content for which continuous viewing is requested, according to an embodiment of the present disclosure.
Figure 9:
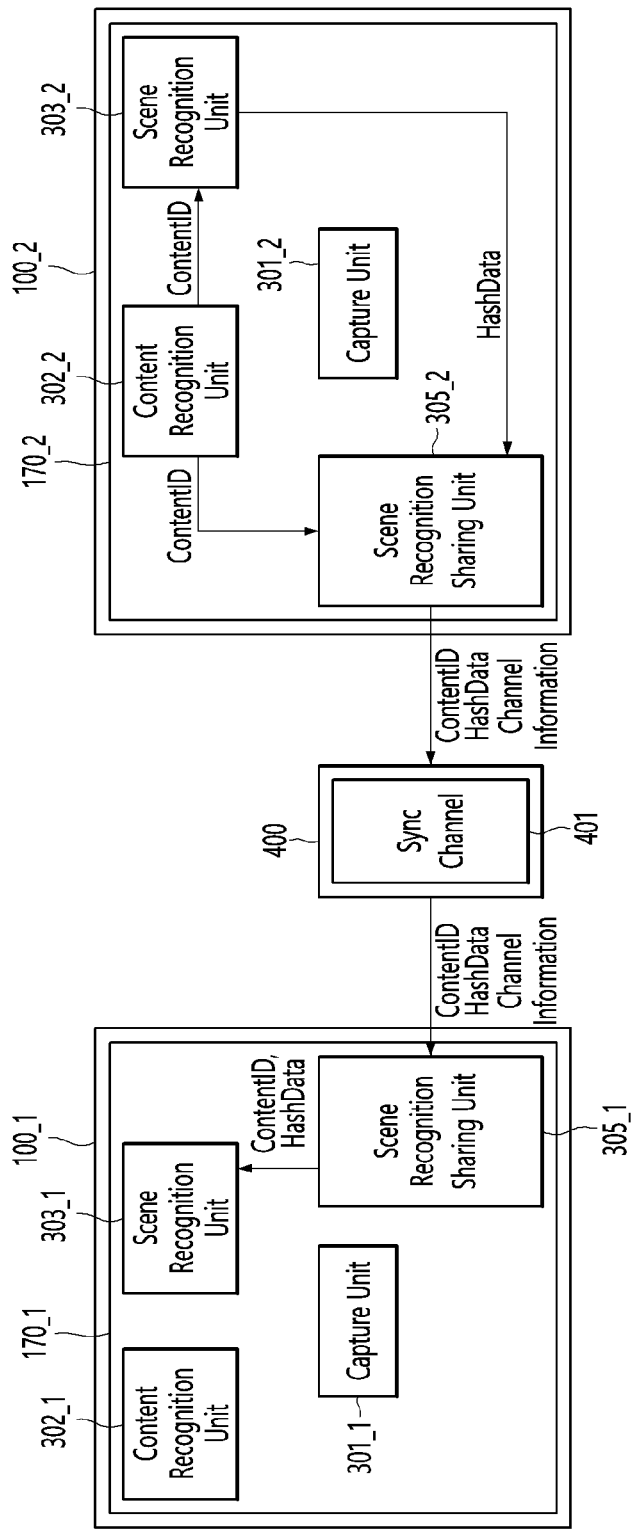
FIG. 9 is a block diagram for describing a method, performed by a display device, for obtaining scene recognition information of content for which continuous viewing is requested, according to an embodiment of the present disclosure.

FIG. 8 is a flowchart for describing a method, performed by a display device, for obtaining scene recognition information of content for which continuous viewing is requested, according to an embodiment of the present disclosure. FIG. 9 is a block diagram for describing a method, performed by a display device, for obtaining scene recognition information of content for which continuous viewing is requested, according to an embodiment of the present disclosure.

Referring to FIGS. 8 and 9, a first display device 101_1 may receive a request for continuous viewing (S801).

For example, a user may move to the first display device 100_1 while viewing predetermined content through a second display device 100_2. In this case, a continuous viewing function allowing a user to continuously view, on the first display device 100_1, the content reproduced on the second display device 100_2 may operate. Accordingly, the first display device 100_1 may receive a request for continuous viewing from a hub device 400 or a second display device 100_2.

The first display device 100_1 may be powered on when receiving the request for continuous viewing even when the power is turned off.

On the other hand, when the first display device 100_1 receives the request for continuous viewing, the first display device 100_1 may receive channel information, content ID, and hash data from the second display device 100_2 through a communication interface (S602).

On the other hand, the first processor 170_1 may determine whether the content recognition function operates (S603).

For example, when the first display device 100_1 is powered on by the request for continuous viewing, a predetermined time may be required when a first content recognition unit 302 initializes various programs (for example, ACR SDK) required for content recognition or sets connection with a content information server 30 at the beginning of the operation. In this case, the first processor 170_1 may determine that the first content recognition unit 302_1 cannot perform the content recognition operation for a predetermined time.

The first processor 170_1 may perform scene recognition by using the received channel information, content ID, and hash data (S604).

The first processor 170_1 may determine whether the content displayed on the first display device 100_1 is the same as the content displayed on the second display device 100_2, based on the received channel information.

On the other hand, when the first display device 100_1 displays content that is not the same as the content displayed on the second display device 100_2, the first processor 170_1 may change the displayed content so that the same content is displayed, based on the received channel information. Accordingly, even when the user moves from the second display device 100_2 to the first display device 100_1, the user can continuously view the content.

On the other hand, the first processor 170_1 may perform scene recognition by using the content ID and the hash data.

The first scene recognition sharing unit 305_1 may transmit, to the scene recognition unit 303_1, the channel information, the content ID, and the hash data received from the second display device 100_2.

The first scene recognition unit 303_1 may transmit, to the scene recognition information server 40, the content ID and the hash data received from the first scene recognition sharing unit 305_1, and may obtain scene recognition information from the scene recognition information server 40.

On the other hand, the first processor 170_1 may display the received scene recognition information on the display 180.

The above description is merely illustrative of the technical spirit of the present invention, and various modifications and changes can be made by those of ordinary skill in the art, without departing from the scope of the present invention.

Therefore, the embodiments disclosed in the present invention are not intended to limit the technical spirit of the present invention, but are intended to explain the technical spirit of the present invention. The scope of the technical spirit of the present invention is not limited by these embodiments.

The scope of the present invention should be interpreted by the appended claims, and all technical ideas within the scope equivalent thereto should be construed as falling within the scope of the present invention.

What is claimed is:

1. A display device comprising:
a display configured to display content; and
a processor configured to:
perform a mirroring operation by causing display of the content on an external device;
determine whether a content recognition function is operable, or is not operable, at the display device;
turn on power of at least one other display device, based on no other display device among the at least one other display device, is powered on;
broadcast first channel information associated with the content to the at least one other display device that is connected through a sync channel of a hub device, based on the content recognition function being not operable at the display device;
obtain hash data and a content ID associated with the content from the at least one other display device, based on the first channel information;
transmit the hash data and the content ID to a scene recognition information server; and
obtain, from the scene recognition information server, scene recognition information that corresponds to the content.

2. The display device of claim 1, wherein the processor is configured to display the scene recognition information on the display of the display device.

3. The display device of claim 2, wherein the processor is configured to perform an operation of mirroring, to the external device, a captured image obtained by capturing the content displayed on the display of the display device along with the scene recognition information.

4. The display device of claim 1, wherein the processor is configured to:
obtain second channel information broadcast from the at least one other display device;
when the content recognition function is operable at the display device, determine whether content displayed on the at least one other display device is a same content as the content displayed on the display device, based on the second channel information; and
when the same content is being displayed, broadcast a content ID and hash data for the same content.

5. The display device of claim 4, wherein the processor is configured to:
generate a captured image by capturing at least one scene of the same content;
generate a capture hash for the captured image;
transmit the capture hash to a content information server;
obtain a second content ID corresponding to the capture hash from the content information server; and
broadcast the second content ID and the captured hash for the captured image.

6. The display device of claim 4, wherein the processor is configured to:
when the content displayed on the at least one other display device is different from the content displayed on the display of the display device, terminate the displaying of the content on the at least one other display device for a predetermined time, and display the same content on the at least one other display device for a predetermined time, based on the second channel information.

7. The display device of claim 1, wherein the processor is configured to:
receive a request for continuous viewing from the at least one other display device;
receive channel information, a second content ID, and second hash data associated with content displayed on the at least one other display device; and
perform scene recognition based on the channel information, the second content ID, and the second hash data.

8. The display device of claim 7, wherein the processor is configured to turn on power of the display device upon receiving the request for continuous viewing when the power of the display device is turned off before receiving the request for continuous viewing.

9. The display device of claim 8, wherein the processor is configured to, when the power of the display device is turned on, initialize a program associated with the content recognition function and establish a connection with a content information server.

10. A scene recognition method comprising:
displaying content;
performing a mirroring operation of displaying the content on an external device;
determining whether a content recognition function is operable, or is not operable;
turning on power of at least one other display device, based on no other display device among the at least one other display device, is powered on;
broadcasting first channel information associated with the content to the at least one other display device that is connected through a sync channel of a hub device, based on the content recognition function being not operable at the display device;
obtaining hash data and a content ID associated with the content from the at least one other display device, based on the first channel information;
transmitting the hash data and the content ID to a scene recognition information server; and
obtaining, from the scene recognition information server, scene recognition information that corresponds to the content.

11. The scene recognition method of claim 10, further comprising displaying the scene recognition information.

12. The scene recognition method of claim 11, further comprising:
capturing the displayed content along with the displayed scene recognition information to obtain a captured image; and
performing an operation of mirroring the captured image to the external device.

13. A scene recognition method performed by a display device, the scene recognition method comprising:
turning on power of at least one other display device, based on no other display device among the at least one other display device, is powered on;
obtaining channel information broadcast from the at least one other display device;
connecting through a sync channel of a hub device;
determining whether a content recognition function is operable, or is not operable, at the display device;
when the content recognition function is operable, determining whether content displayed on the at least one other display device is a same content as content displayed on the display device, based on the channel information; and
when the same content is being displayed, broadcasting a content ID and hash data for the same content to a content information server.

14. The scene recognition method of claim 13, wherein the broadcasting of the content ID and the hash data for the same content comprises:
generating a captured image obtained by capturing at least one scene of the same content;
generating a capture hash for the captured image;
transmitting the capture hash to the content information server; and
obtaining a content ID corresponding to the capture hash from the content information server.

15. The scene recognition method of claim 13, further comprising when the content displayed on the at least one other display device is different from the content displayed on the display of the display device, terminate the displaying of the content on the at least one other display device for a predetermined time, and displaying the same content on the at least one other display device for the predetermined time, based on the channel information.

* * * * *